United States Patent [19]

Kable et al.

[11] Patent Number: 4,665,283

[45] Date of Patent: May 12, 1987

[54] ELECTROGRAPHIC APPARATUS

[75] Inventors: Robert G. Kable, Dublin; Philip A. Schlosser, Columbus, both of Ohio

[73] Assignee: Scriptel Corporation, Columbus, Ohio

[21] Appl. No.: 794,171

[22] Filed: Nov. 1, 1985

[51] Int. Cl.$^4$ .............................................. G08C 21/00
[52] U.S. Cl. ...................................................... 178/19
[58] Field of Search .............................. 178/19, 18, 20

[56] References Cited

U.S. PATENT DOCUMENTS

| | | | |
|---|---|---|---|
| 3,399,401 | 8/1968 | Ellis et al. | 178/18 |
| 3,567,859 | 3/1971 | Ellis | 178/18 |
| 3,914,548 | 10/1975 | Barish | 178/18 |
| 3,974,332 | 10/1976 | Abe | 178/18 |
| 4,143,240 | 3/1979 | Kobayashi | 178/19 |
| 4,198,539 | 4/1980 | Pepper | 178/18 |
| 4,293,734 | 10/1981 | Pepper | 178/18 |
| 4,353,552 | 10/1982 | Pepper | 273/85 G |
| 4,371,746 | 2/1983 | Pepper | 178/18 |
| 4,435,616 | 3/1984 | Kley | 178/18 |

*Primary Examiner*—Stafford D. Schreyer
*Attorney, Agent, or Firm*—Mueller and Smith

[57] ABSTRACT

An electrographic apparatus or digitizer has a resistive layer with an active area which operates in conjunction with a stylus or other suitable position locator. An a.c. source or alternatively a signal treatment means is connected to the resistive layer through rows of electrodes and position coordinates of the position locator are developed by the apparatus. Voids or discontinuities are formed in the resistive layer to increase the edge-to-edge resistance of the layer and to provide identical edge-to-edge resistances in the x- and the y-coordinate direction for digitizers which are rectangular and non-square.

10 Claims, 7 Drawing Figures

ELECTROGRAPHIC APPARATUS

BACKGROUND OF THE INVENTION

The generation of electrical signals representing the coordinates of locations on electrographic devices has been the subject of investigation and study for many years. Such devices are found in computer graphics, computer-aided design, and computer-aided manufacturing systems. For such utilization, however, the digitizers or graphics tablets representing such devices are called upon to perform with a high degree of accuracy. The operation of a digitizer or graphics tablet generally involves the same manual procedures as are employed in conventional graphics design, a stylus or tracer or other suitable position locator representing a writing instrument being drawn across or selectively positioned upon the tablet surface. in turn, the electrographic device responds to the stylus to generate analog paired coordinate signals which are digitized and conveyed to a host computer facility.

Traditionally, graphics tablets have been fashioned as composite structures wherein a grid formed of two spaced arrays of mutually orthogonally disposed fine wires is embedded in an insulative carrier. One surface of this structure serves to yieldably receive a stylus input which is converted to coordinate signals. Various methods have been evolved for generating coordinate defining signals as a stylus-grid interaction, for example a magnetostrictive effect may be established between stylus and grid or a capacitive coupling effect may be evoked between these components.

Graphics tablets utilizing composite structures, while providing accurate, linear output coordinate signals necessarily are expensive to fabricate and are prone to damage in the normal course of use. Further, for many applications, it is desirable that the tablet be fabricated as a transparent sheet. Grid formations within composite structures generally preclude such a transparency feature.

Early investigators have observed the advantage of developing graphics tablets having writing surfaces formed as a continuous resistive layer. An immediately recognized advantage for this approach to tablet design resides in the inherent simplicity of merely providing a resistive surface upon a supportive insulative substrate such as glass or plastic. Further, the substrates and associated resistive layers may be transparent to permit an expanded range of industrial applications.

As resistive layer type electrographic systems or digitizers have evolved, technical improvements have been achieved which have enhanced the accuracy, i.e. the correspondence between the actual stylus or tracer position and the measured or indicated position, of the devices. As an example, Schlosser, et al. describes an improvement wherein an a.c. input signal is utilized in conjunction with the devices and signal treatment of the resulting coordinate pair output signal is improved considerably. See U.S. Pat. No. 4,456,787 entitled "Electrographic System and Method", issued June 26, 1984, and assigned in common herewith. Position responsive performance of the resistive layer devices has been improved further by a voltage waveform crossing approach in an arrangement wherein a.c. signals are applied to the resistive layer itself to be detected by a stylus or tracer as illustrated in U.S. Pat. No. 4,055,726 by Turner, et al. entitled "Electrical Position Resolving by Zero-Crossing Delay", issued Oct. 25, 1977, and also assigned in common herewith. Kable describes still another improvement in position responsive performance wherein an a.c. input is utilized in conjunction with a solid-state switching arrangement and a computer program. A description of this improvement may be found in U.S. Pat. No. 4,600,807, also assigned in common herewith. Still another improvement is disclosed in Nakamura, et al., U.S. patent application Ser. No. 664,980, abandoned, entitled "Electrographic System and Method" and assigned in commn herewith. In Nakamura, et al., position responsive performance is enhanced through utilization of a computer controlled interpolative error correction procedure.

A variety of technical problems have been encountered in the development of such resistive layer type devices for applications which demand a very high degree of accuracy or correspondence between the actual stylus or tracer position and the measured or indicated position, e.g. accuracy on the order of 0.010 inch. Applications that require highly accurate devices include computer graphics, computer-aided design, and computer-aided manufacturing systems.

One technical problem which has been encountered is that of erroneous position readings caused by stray capacitance. An example of the effect of stray capacitance may be observed when hands or arms or other objects are placed upon the surface of the digitizer and the digital readout changes while the stylus remains stationary. This effect of stray capacitance is called "hand effect". Another problem which has been encountered in resistive layer devices is that of obtaining the same resistance between the x-coordinate and y-coordinate, i.e. horizontal and the vertical pairs of edges of rectangular non-square devices. In a resistive layer device of uniform thickness, the edge-to-edge resistance is a function of the length of the material which forms the resistive layer. When the device is rectangular but not square, the lengthwise extent of the resistive layer is different in the horizontal and vertical directions and the edge-to-edge resistances are different in these directions. If the edge-to-edge resistance is not the same in both of these directions, the resolution of the system is not the same in both directions.

A further problem which has arisen in the development of resistive layer type digitizers is that of "drift" or change of system accuracy with time. Investigators have discovered that for digitizers utilizing some types of resistive layer materials, the accuracy of the digitizer may change adversely over a period of months or years and that ultimately the accuracy of the device may become unacceptable. Still another problem which has been encountered in the development of highly accurate resistive layer type devices is that of electrical interference, or "noise" in the operating environment of the devices.

It is desirable to provide a resistive layer type digitizer which will be relatively immune to stray capacitances and which will have the same edge-to-edge resistances in the horizontal and vertical directions when the device is shaped in irregular fashion. Additionally, it is desirable to provide a resistive layer type which will not undergo a change of accuracy over a reasonable period of time and which will have an optimum signal-to-noise ratio.

SUMMARY OF THE INVENTION

The present invention is directed to a resistive layer type electrographic system wherein the resistive material is a uniform layer of predetermined thickness and surface resistivity having a first profile and located upon an insulative substrate. The resistive layer defines an active area located within a second profile which exhibits a first edge-to-edge resistance in an x-coordinate direction and a second edge-to-edge resistance in a y-coordinate direction. A pattern of discontinuities is formed within the resistive layer in the active area to obtain a desired edge-to-edge resistanc in the x- and in the y-coordinate directions. As a consequence, considerable improvements in system accuracy are realized.

The invention, accordingly, comprises the apparatus and system possessing the construction, combination of elements, and arrangement of parts which are exemplified in the following Detailed Description.

For a fuller understanding of the nature and features of the invention, reference should be had to the following Detailed Description taken in conjunction with the accompanying drawings.

DETAILED DESCRIPTION OF THE INVENTION

In the following description, an electrographic device is described wherein the resistive surface or layer of a touch-tablet or digitizer or graphics tablet is excited by an a.c. source as opposed to the application of such source through a stylus or tracer or other suitable position locator. However, it should be understood that, with the exception of the selection of excitation frequencies, the same structure and circuit as is described herein may be utilized with the latter configuration.

Figure 1:
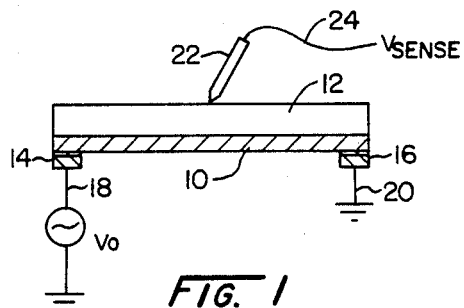
FIG. 1 is a schematic representation of a one-dimensional model of an electrographic apparatus.
Figure 2:
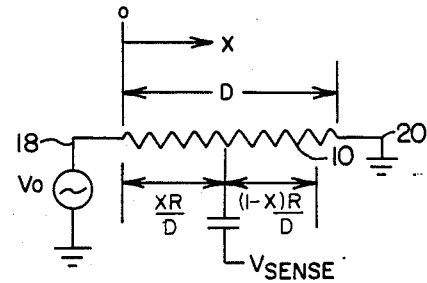
FIG. 2 is a schematic equivalent circuit model of FIG. 1.
Figure 3:
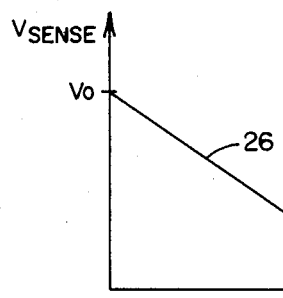
FIG. 3 is a schematic idealized curve showing voltage distribution across one axis of the resistive layer represented in FIG. 1.

As a preliminary consideration of the instant apparatus, reference is made to FIGS. 1–3 wherein an idealized, one-dimensional model of the graphics tablet is revealed. In FIG. 1, a resistive surface or sheet, for example, formed of a layer of indium-tin-oxide is represented at 10. This layer has been deposited onto a dielectric support material such as glass represented at 12. Electrodes are shown coupled to the resistive layer 10 at 14 and 16. Electrode 14 is coupled with an a.c. source designated $V_0$ through line 18, while electrode 16 is coupled to ground through line 20. A pick-up 22 which may be a stylus, tracer, or other suitable position locator is positioned on material 12 adjacent resistive layer 10 at any given location and through capacitive coupling serves to pick-up a voltage output at line 24, such voltage being labelled "$V_{sense}$". The equivalent circuit for this idealized one-dimensional model is represented in FIG. 2 where the resistive layer 10 is shown as a resistor and the distance of the stylus 22 from the edge of the resistor closest to the source $V_0$ is represented as "X" and the distance between electrodes 14 and 16 is represented as "D". The fraction of resistance "R" of layer 10 extending from the source of voltage excitation to the stylus 22 at location X, may be represented by XR/D, while the distance from the location of the stylus 22 to the opposite electrode 16 may be labelled as $((1-x)R/D)$. The corresponding idealized value for $V_{sense}$ is shown in FIG. 3 as being linear, as represented by line 26. To derive coordinate pairs of signals representing the position of stylus 22 on the resistive layer 10, measurements of the voltage $V_{sense}$ are made along orthogonally disposed axes designated x and y. Through the utilization of switching, the application of the voltage source as through line 18 and the connection of ground as through line 20 as shown in FIG. 1 are alternately reversed for each of the x and y-coordinates. With the values thus obtained for each designated x and y-coordinate, a difference/sum voltage ratio is determined to obtain a coordinate position signal. For various reasons, some of which will be discussed hereinafter, the coordinate position signal thus obtained may not correspond exactly with the actual position of the position locator 22, i.e. the system may have a small degree of inaccuracy.

Figure 4:
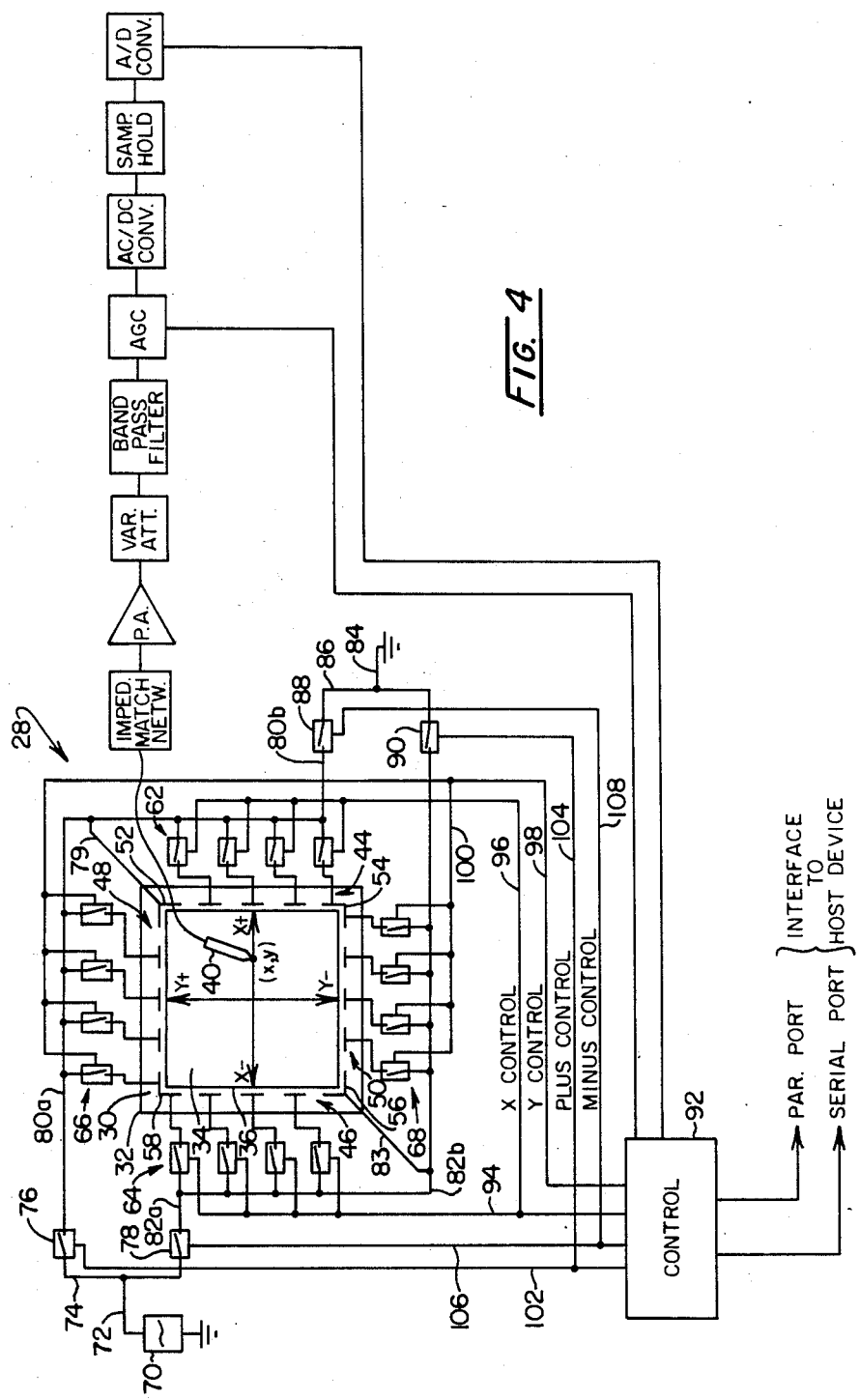
FIG. 4 is a schematic representation showing the circuit and switching components of an electrographic apparatus.

Referring to FIG. 4, an electrographic apparatus is shown generally in schematic fashion at 28. Apparatus 28 incorporates a switching scheme for carrying out the difference/sum ratio coordinate determining technique. In the figure, a resistive layer is shown at 30 having a rectangular shape or outer profile 32 and an active area 34 having a rectangular profile 36 that is formed within the outer profile 32. The active area 34 is accessed by a position locator present as a stylus or tracer 40 at some point (x, y). The resistive layer 30 is shown having designated x+ and x− axes as well as y+ and y− axes, the intersection therebetween being essentially at the center of the rectangularly configured active area 34.

Designating the coordinate system shown to range from +1 to −1 in both the x and y directions, a signal representing any given coordinate (x, y) pair can be determined by measuring the voltage value picked up by stylus 40 under a procedure where the alternating current source or time varying excitation source intially is applied to one edge of the resistive layer 30 in one coordinate direction while ground reference is applied to the oppositely disposed edge. This procedure then is reversed for the first coordinate direction and the combined readings may be used to determine one coordinate. The procedure then is carried out in the opposite coordinate sense. During the data collection procedure, one set of coordinate border regions or edges of the resistive layer 30, for example, the y+ and y− border regions are permitted to "float" in electrical isolation while the oppositely disposed, or for example, the x+ and x− coordinate border regions are operated upon by alternately applying ground and the a.c. source thereto. Permitting the set of non-operating coordinate border regions to float enables the voltage gradients perpendicular to these regions to become substantially linear at the border regions. If the inactive border regions were held to a set potential, the voltage gradients adjacent these regions would be distorted. Application of the difference/sum voltage ratio to derive paired coordinate signals may be seen from the following example. In this example, the output of stylus 40 will be arbitrarily designed XPLUS when an a.c. current source is applied along the XPLUS coordinate border region of layer 30 while simultaneously ground is applied to the opposite XMINUS border region and the stylus output will be arbitrarily designated XMINUS when the opposite condition obtains wherein the a.c. source is applied along the XMINUS coordinate border region of layer 30 while simultaneously ground is applied to the oppositely disposed XPLUS region. Similarly, YPLUS will be the arbitrarily designated output of stylus 40 when the a.c. source is applied to resistive layer 30 at the YPLUS border region and ground is applied to the opposite YMINUS border region and the output signal at stylus 40 will be designated YMINUS when the a.c. current source is applied to the YMINUS border region of resistive layer 30 and ground is applied to the opposite YPLUS region. Utilizing the aforementioned difference/sum voltage ratio in conjunction with the designated signal values, paired coordinate signals for any position of the stylus 40 on layer 30 may be derived as follows:

$$\text{position } x = \frac{(X\text{PLUS}) - (X\text{MINUS})}{(X\text{PLUS}) + (X\text{MINUS})}$$

$$\text{position } y = \frac{(Y\text{PLUS}) - (Y\text{MINUS})}{(Y\text{PLUS}) + (Y\text{MINUS})}$$

The imposition of the a.c. signals as well as application of the ground couplings to the resistive layer 30 are carried out through contacts or electrodes provided as elongate pads positioned in rows in the border regions and at corners of the border regions. Conventionally such electrodes are spaced equally distance from each other, have a length approximately equal to the distance they are spaced-apart, and are positoned between the outer profile 32 of the resistive layer 30 and the active area 34. FIG. 4 shows an array of four such electrodes along the XPLUS border region at 44, while an oppositely disposed array of such electrodes for the XMINUS region is represented at 46. Correspondingly, an array of four spaced-apart electrodes along the YPLUS designated border region is shown at 48 while an oppositely positioned array of electrodes along the region designated YMINUS is shown at 50. L-shaped corner electrodes 52, 54, 56, and 58 are positioned at the corners of the adjacent electrode arrays 44, 46, 48, and 50. Corner electrodes 52, 54, 56, and 58 function independently of the electrodes within arrays 44, 46, 48, and 50 as will be described hereinafter and are not considered part of the electrode arrays.

Each of the electrodes within array 44 thereof at the XPLUS border region is connected to one side of a single-pole, single-throw analog switch of an array thereof shown at 62. Similarly, each electrode of the array 46 at the XMINUS region is connected to a corresponding single-pole, single-throw analog switch of an array thereof shown generally at 64. Correspondingly, each electrode within the array 48 at the YPLUS border region is connected to a corresponding single-pole, single-throw analog switch of an array thereof shown generally at 66, while the oppositely-disposed YMINUS border region electrodes of the array 50 are each coupled to a corresponding single-pole, single-throw analog switch of an array 68 thereof. Corner electrode 54 is connected to a single-pole, single-throw analog switch within the array 62 and to a single-pole, single-throw analog switch within array the 68. Similarly, diagonally positioned corner electrode 58 is connected to a single-pole, single-throw analog switch within the array 66 and to a single-pole, single-throw analog switch within the array 64.

An a.c. source for exciting the resistive layer 30 is represented at 70 having an output at line 72 extending through line 74 to the inputs of two single-pole, single-throw analog switches 76 and 78. The output side of switch 76 is coupled to a bus 80a which, in turn, extends in common to the inputs of each analog switch within arrays 66 and 62 and to corner electrode 52 through line 79. Correspondingly, the output of switch 78 extends via bus components 82a and 82b to the common inputs of the analog switches within arrays 64 and 68 and to corner electrode 56 through line 83. A ground which must be established for operating the electrographic apparatus 28 incorporating the resistive layer 30 is derived from line 84 which extends through line 86 to the inputs of two single-pole, single-throw analog switches 88 and 90. The output of switch 88 is coupled to bus component 80b leading through bus 80a in common to the inputs of the analog switches within arrays 62 and 66 and to corner electrode 52. Similarly, the output of analog switch 90 is coupled to bus component 82b which is connected in common to the inputs of the analog switches within arrays 64 and 68 and to corner electrode 56. All of the above-described analog switches are actuated by logic compatible voltage signals developed at the output of a central control including a microprocessor as represented at block 92. Thus, by appropriate signal actuation through lines 94 and 96 labelled "XCONTROL" (first coordinate logic signal), all of the switches along the x axis as represented at arrays 62 and 64 may be closed or opened simultaneously. In a similar fashion, the control 72 may assert an actuating signal along lines 98 and 100, labelled "YCONTROL" (second coordinate logic signal), to simultaneously open or close all of the switches along the y axis as represented at arrays 66 and 68. Control 92 also may assert simultaneous actuating and deactuating signals from along lines 102 and 104 labelled "PLUSCONTROL" (first directional logic signal) to switches 76 and 90. By such actuation, the a.c. source may be applied to bus 80a and thence to the inputs of the YPLUS switch array 66, corner electrode 52, and to the inputs of the XPLUS switch array 62 while the oppositely disposed YMINUS switch array 68, corner electrode 56, and XMINUS switch array 64 may be coupled to ground simultaneously through bus 82b. In a similar fashion, the control 92 may asset an actuating signal along lines 106 and 108 labelled "MINUSCONTROL" (second directional logic signal) to effect the actuation of switches 78 and 88 and passage of signals from a.c. source 70 through buses 82a and 82b to the inputs of the XMINUS switch array 64, corner electrode 56, and the YMINUS switch array 68, while simultaneously connecting the inputs of the YPLUS switch array 66, corner electrode 52, and the XPLUS switch array 62 with ground through buses 80a and 80b. By sequentially actuating the "XCONTROL" and "YCONTROL" and alternating the "PLUSCONTROL" and the "MINUSCONTROL" during the time the x and y controls are actuated, the a.c. source will be applied sequentially first to the switch arrays 62 and 64 in the x-coordinate direction and subsequently to the switch arrays 66 and 68 in the y-coordinate direction. It may be observed that the corner electrodes 52 and 56 are directly connected to buses 80a and 82b, respectively. Hence, these electrodes are always connected to the a.c. source or to ground. Also, because corner electrode 54 is connected to two adjacent switch arrays 62 and 68 and corner electrode 58 is connected to two switch arrays 64 and 66, and because one of the adjacent arrays connected to the corner electrodes 54 and 58 is always at an active state, the corner electrodes 54 and 58 are always connected to either the a.c. source or to ground. Thus, the corner electrodes 52, 54, 56, and 58 never "float" in electrical isolation.

Figure 5:
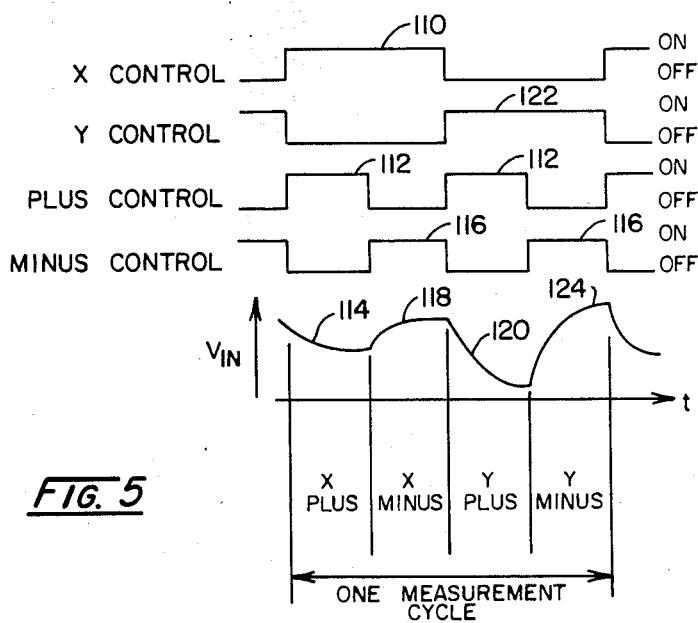
FIG. 5 is a schematic representation of timing diagrams and control sequence curves for sequential operation or data modes of the apparatus of FIG. 4.

Referring to FIG. 5, the modes of operation for carrying out one coordinate measurement cycle are illustrated in timing diagram form. Thus, it may be observed that XCONTROL lines 94 and 96 provide an "on" or actuating signal represeted at 110 simultaneously with a corresponding "on" signal at PLUSCONTROL lines 102 and 104 as represented at 112 to develop an XPLUS signal as represented at curve 114 during a first quarter interval of one measurement cycle. Similarly, an "on" condition for the XCONTROL signal as represented at 110 generated in combination with a corresponding "on" actuating signal at MINUSCONTROL lines 106 and 108 as represented at 116 causes an XMINUS signal to be developed. This signal is represented at curve 118 and represents the second quarter of the measurement cycle. The third quarter of the measurement cycle is shown developing the YPLUS signal shown at curve 120 by the assumption of an "on" or actuating state of the YCONTROL lines 98 and 100 as represented at 122. Simultaneously, with this "on" status as represented at 122, the PLUSCONTROL lines 102 and 104 carry an actuating signal as represented by the "on" status shown at 112. Finally, the YMINUS signal represented at curve 124 is developed for the fourth quarter of the measurement cycle with the assertion of an "on" status at the YCONTROL lines 98 and 100 as represented at 122 in combination with a corresponding "on" condition at the MINUSCONTROL lines 106 and 108 as represented at 116. With the arrangement thus depicted, the a.c. source 70 is applied first to one border region and then to the opposite region in the x-coordinate direction. Subsequently, the same arrangement is provided for the y-coordinate direction. The switches in the arrays of the coordinate direction not being operated remain open to permit that pair of border regions to "float" in electrical isolation and thereby reduce distortion of voltage gradients in those regions.

Utilizing the coordinate determining procedure described in conjunction with FIG. 4, the measured position of the stylus 40 will correspond substantially with the actual position of the stylus 40. However, it has been discovered that the performance of the digitizer will be enhanced considerably if the edge-to-edge resistance of the active area 34 is maintained within a relatively narrow range and if the surface resistivity of the resistive layer 30 is kept to a minimum. An edge-to-edge resistance, i.e. the resistance between the edges of the active area in any given coordinate direction, within the range of 400 to 3,000 ohms is preferred. If the edge-to-edge resistance is significantly less than 400 ohms, the power-required to drive the electrographic apparatus 28 becomes excessive and relatively expensive and complex circuitry must be utilized.

It has been found advantageous to form the resistive layer 30 of the digitizer with a relatively low surface resistivity, which is the resistance of any square area such as one square inch or one square foot of the layer, because as the surface resistivity is increased, the distortion of the tablet's electric field due to stray capacitance becomes more pronounced and the accuracy of the electrographic apparatus 28 may be affected adversely. The distortion occurs because a hand or arm, or any other conductive object which is electrically connected to ground potential acts as a capacitor in parallel with the stylus signal when placed on the resistive layer 30. This causes a distortion of the voltage signal which is picked up by the stylus which, in turn, results in the computation of a sightly erroneous coordinate position by the digitizer. In addition to being proportional to surface resistivity, the effect of stray capacitance also is proportional to the area of the resistive layer 30 and to the frequency of the drive circuit. It is not practical to attempt to reduce the effects of stray capacitance solely by lowering the drive circuit frequency because the amount of signal picked up by the stylus 22 also is proportional to this frequency and a relatively high drive circuit frequency is necessary to ensure that a strong signal is picked up by the stylus 22. It should be noted that although a high drive circuit frequency is desired, the cost of components increases substantially when they are called upon to operate at drive circuit frequencies greater than about 250 KHz. Consequently, it has been determined that a satisfactory signal pick-up may be obtained if the drive signal has a frequency within the range of approximately 20 to 250 KHz. Thus, the effects of stray capacitances may be reduced either by lowering the surface resistivity of the resistive layer 30 or by reducing the area of the resistive layer 30.

It has been discovered that lowering the surface resistivity of the resistive layer 30 also reduces the effect of energy radiated from or transmitted from the environment termed "environmental noise" which is received by the digitizer 28. This radiation or "noise" which is picked-up by the receiving portion of the digitizer circuit, degrades the performance of the system by causing a random jitter of the coordinates computed by the device. Like stray capacitances, the effect of environmental noise is proportional to the surface resistivity of the resistive layer 30 and to the area of the layer 30.

In order to provide a minimum edge-to-edge resistance of 400 ohms in both coordinate directions, it is necessary for the resistive layer 30 to have a minimum surface resistivity of 400 ohms per square. If the digitizer is square-shaped and the surface resistivity is 400 ohms per square, the edge-to-edge distance will be 400 ohms in both the x and y-coordinate directions. If the digitizer profile is rectangular but not square, the edge-to-edge resistance in the x and y-coordinate directions will differ by the square of the geometrical aspect ratio, i.e. the width of height ratio, of the resistive layer 30. Consequently, the surface resistivity of the layer must be greater than 400 ohms per square in order to obtain a minimum edge-to-edge resistance of 400 ohms in the coordinate direction in which the resistive layer 30 is the narrowest. For example, if the geometrical aspect ratio of the resistive layer 30 is 1.5, i.e. the dimension of the layer in the x-coordinate direction is 1.5 times the dimension of the layer in the y-coordinate direction, the edge-to-edge resistance of resistive layer 30 in the x- coordinate direction will be 2.25 times the edge-to-edge resistance in the y-coordinate direction. In order to obtain a minimum edge-to-edge resistance of 400 ohms in the y-coordinate direction, the surface resistivity of layer 30 must be 600 ohms per square. This will provide a edge-to-edge resistance in the x-coordinate direction of 900 ohms and an edge-to-edge resistance in the y-coordinate direction of 400 ohms.

Significant production problems have been encountered in consistently providing resistive layer 30 with a coating having a surface resistivity of 400 ohms per square or more. These problems include non-uniformity of surface resistivity caused by variations in the thickness of the coating and change of surface resistivity over a period of time termed "drift". The non-uniformity problem has been overcome substantially through utilization of the error correction procedure described in the aforementioned patent application of Nakamura, et al. However, the drift problem has not been resolved satisfactorily in coatings having a surface resistivity greater than 400 ohms per square. It has been found that a new digitizer having a resistive layer with a surface resistivity of 500 ohms per square and an accuracy of ±0.010 inch may, over a period of one year, undergo a change in surface resistivity of 10 ohms per square and a degradation of accuracy to ±0.030 inch. It is believed that drift occurs because indium-tin-oxide (ITO) coatings having a surface resistivity of 400 ohms per square or more are extremely thin, i.e. on the order of 12 atom layers thick. Consequently, over a period of time, water, oxygen, fingerprints, sulfur, etc. are deposited on the surface of these atom layers; oxidizing and reducing gases enter between the ITO grains, and surface resistivity is changed. It has been learned that if the ITO coating is made relatively thick, i.e. greater than 100 atom layers thick i.e. about 400 angstrum units, the surface resistivity of the resistive layer 30 undergoes little change over a period of time. It is theorized that only the top atom layers or skin of the coating are subject to environmental factors and that in a thick ITO coating the majority of the atom layers are unaffected by thse factors. Therefore, the surface resistivity or bulk conductor of a thick layer remains relatively unchanged over a period of time. In contrast thereto in a thin ITO coating a significant portion of the atom layers are affected by environmental factors and its surface resistivity undergoes some change over a period of time. Unfortunately, when an ITO coating is made thick enough to resolve satisfactorily the problem of drift, the maximum surface resistivity of the resistive layer 30 which can be obtained in commercial quantities is approximately 100 to 400 ohms per square.

The edge-to-edge resistance of resistive layer 30 can be increased in both the x and y-coordinate directions by forming a pattern of voids or discontinuities thereon. Furthermore, the discontinuities may be configured to provide any desired resistance aspect ratio, i.e. the ratio of the resistance of the resistive layer 30 in the x-coordinate direction to the resistance of layer 30 in the y-coordinate direction. Consequently, the resistive layer 30 may be made to have an advantageously low surface resistivity to reduce the effects of stray capacitance and environmental noise and to eliminate draft and non-square rectangular tablets may be configured to have the same edge-to-edge resistance in both the x and the y-coordinate directions, i.e. an edge-to-edge resistance aspect ratio of unity. Although an edge-to-edge resistance aspect ratio of unity is preferred, an edge-to-edge resistance aspect ratio between 0.5 and 2.0 is acceptable.

Figure 6:
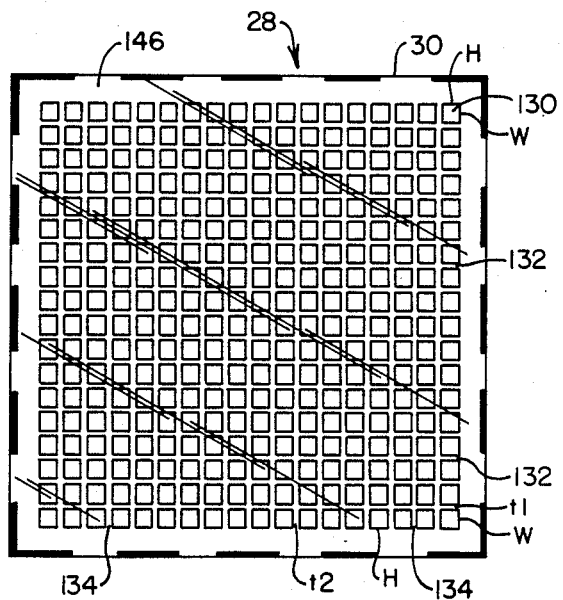
FIG. 6 is a schematic representation of the rectangular graphics tablet depicted in FIG. 4 showing a pattern of discrete discontinuities formed in an active area that is square.

Turning to FIG. 6, a pattern which is comprised of a plurality of small, symmetrical, discrete discontinuities 130 is formed in resistive layer 30 which is illustrated as being square. The discontinuities 130 preferably are areas which are void of any of the resistive material or coating which comprises resistive layer 30. However, they may be areas of resistive material which are electrically insulated from the remainder of resistive layer 30. Tracks 132 of resistive material extend between the discontinuities 130 in the x-coordinate direction and tracks 134 of resistive material extend between the discontinuities 130 in the y-coordinate direction. Since the edge-to-edge resistance of resistive layer 30 for any surface resistivity is inversely proportional to area, the edge-to-edge resistance of the resistive layer 30 may be increased by forming discontinuities 130 thereon to decrease the area of the resistive coating or material. Furthermore, if the coating of resistive layer 30 is relatively thick it has a uniform thickness and a uniform surface resistivity which permits the calculation of the length of the discontinuities in the x and in the y-coordinate directions to be considered to be two one-dimensional problems. If the surface resistivity of the resistive layer 30 is 100 ohms per square, the edge-to-edge resistance in both the x and the y-coordinate directions is 100 ohms because the layer 30 is square. In other words, the edge-to-edge resistance aspect ratio is 1. If it is assumed that an edge-to-edge resistance of 400 ohms is required in the x-coordinate direction, the area of layer 30 in the x-coordinate direction must be reduced by a factor of 400 divided by 100 which equals 4. Thus, the thickness T1 of the tracks 132 in the x-coordinate direction must be ¼ the total width of the sum of the width of a track 132 and the width W of a discontinuity 130. Similarly, if an edge-to-edge resistance of 400 ohms in the y-coordinate direction is required, the thickness T2 of the tracks 134 in the y-coordinate direction must be ¼ the total width of the sum of the width of a track 134 and the height H of a discontinuity 130. The width W and the height H of a discontinuity 130 also may be calculated using the formulas:

$$W=(N1-1)T1$$

$$H=(N2-1)T2$$

where N1 is the ratio of the desired edge-to-edge resistance in the x-coordinate direction to the surface resistivity of layer 30; N2 is the ratio of the desired edge-to-edge resistance in the y-coordinate direction to the surface resistivity of layer 30; T1 is the thickness or widthwise dimension of the tracks which extend in the x-coordinate direction; and T2 is the thickness or widthwise dimension of tracks which extend in the y-coordinate direction. A preferred minimum thickness T1 and T2 for the tracks 132 and 134 is 0.100 inch. Therefore, the discontinuities would have a width W and a height H of 0.300 inch. It should be noted that since the edge-to-edge resistances in the x and in the y-coordinate directions are both 400 ohms, the edge-to-edge resistance aspect ratio of resistive layer 30 is unity.

Figure 7:
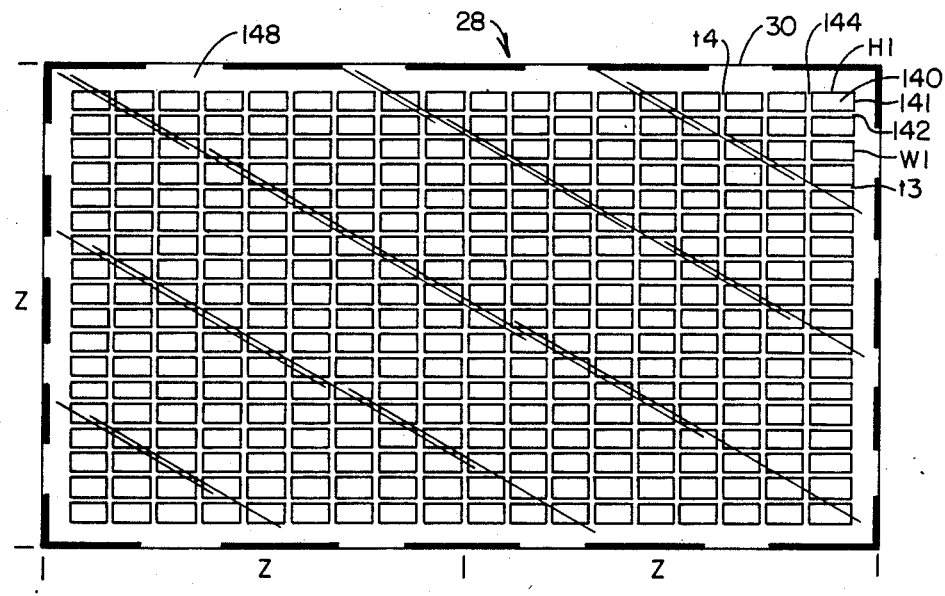
FIG. 7 is a schematic representation similar to FIG. 6 illustrating a pattern of discrete discontinuities formed in an active area that is not square.

Looking to FIG. 7, the resistive layer 30 of electrographic apparatus 28 is shown as being rectangular and non-square and having a plurality of small, symmetrical, discrete discontinuties 140 formed thereon. As mentioned, discontinuities 140 may be configured to provide resistive layer 30 with an edge-to-edge resistance aspect ratio of unity or any other value. As an example, let it be assumed that the electrographic apparatus 28 requires that resistive layer 30 have a surface resistivity of 100 ohms per square, that layer 30 be twice as long in the x-coordinate direction as it is in the y-coordinate direction, i.e. that it have a geometrical aspect ratio of 2, and that the edge-to-edge resistance in the x and y-coordinate directions be 400 ohms. Because resistive layer 30 is twice as long as it is wide, it may be considered as being two z units long in the x-coordinate direction and z units long in the y coordinate direction. Thus, layer 30 has two square areas which have sides z units long. Looking in the x-coordinate direction the two square areas are in series and looking in the y-coordinate direction the areas are in parallel. Thus, resistive layer 30 is the electrical equivalent of two squares of resistive material in series in the x-coordinate direction for an edge-to-edge resistance of 200 ohms and the electrical equivalent of ½ square of material in the y-coordinate direction for an edge-to-edge resistance of 50 ohms. In order to make the edge-to-edge resistance 400 ohms in the x coordinate direction, the area in that direction must be reduced by a factor of 400 divided by 200 which equals 2. Therefore, the thickness T3 of the tracks 142 in the x-coordinate direction must be ½ the total of the sum of the thickness T3 of a track 142 and the width W1 of a discontinuity 140. If the tracks 142 have a thickness T3 of 0.100 inch, the width W1 of the discontinuities 140 must be 0.100 inches. The same value is obtained using the formula:

$$W1 = (N1 - 1)T3,$$

where $N1 = 400/200 = 2$, and $T3 = 0.100$. In a similar fashion, in order to make the edge-to-edge resistance 400 ohms in the y-coordinate direction the area in that direction must be reduced by a factor of 400 divided by 50 which equals 8. Consequently, the thickness T4 of the tracks 144 in the y coordinate direction must be ⅛ the total of the sum of the thickness T4 of a track 144 and the height H1 of a discontinuity 140. If the tracks 144 have a thickness T4 of 0.100 inches, the height H1 of the discontinuities must be 0.700 inch. Again, the same value is obtained using the formula:

$$H1 = (N2 - 1)T4,$$

where $N2 = 400/50 = 8$, and $T4 = 0.100$. Since the edge-to-edge resistances in the x and in the y coordinate directions are equal, the resistance aspect ratio of the non-square tablet shown in FIG. 7 is unity.

From the above it may be observed that the edge-to-edge resistance of a resistive layer may be altered to obtain a desired edge-to-edge resistance aspect ratio. Consequently, the resistive layer 30 may be formed from a coating having a relatively low surface resistivity, for example on the order of 100 ohms per square, which will eliminate substantially the problem of drift, which will reduce the effect of stray capacitance, and which will reduce the effect of environmental noise. Furthermore, forming discontinuities or voids on the resistive layer 30 has the additional advantage of reducing the area of the resistive material which comprises the resistive layer 30. Because the effects of stray capacitance and environmental noise are directly proportional to the area of the resistive layer material as well as the surface resistivity of the material, reducing the area by forming discontinuities or voids on resistive layer 30 will reduce further the effects of stray capacitance and environmental noise. This will enhance further the accuracy of the digitizer 28.

Turning again to FIGS. 6 and 7, it may be seen that in each of these figures a narrow band 146 and 148 is formed around the perimeter of the resistive layer 30 outside of the patterns of discontinuities 130 and 140, respectively. Because the bands 146 and 148 do not contain discontinuous areas they have less resistance or greater conductivity than the active area portion of the resistive layer 30. It has been found that an enhanced conductivity band 146 and 148 interposed between the active area and the electrodes reduces signal distortion in the areas around and between the electrodes. Thus, with the present invention, a resistive layer 30 having a surface resistivity suitable for a conductivity band may be formed on digitizer 28 and discontinuities may be formed on the layer 30 to provide an active area having desired edge-to-edge resistances. Although the conductivity bands 146 and 148 are preferred, they are not essential to the present invention and the patterns of discontinuities 130 and 140 may extend to the electrodes. In some instances it may be desired to change the resistance within a conductivity band 146 and 148 or within a portion of a band. This may be accomplished by forming discontinuities or voids within the band or within a portion of the band which are configured to provide the required resistance. Obviously, the discontinuities may have a configuration different from that of the discontinuities within the active area.

After the dimensions of the discontinuities 130 and 140 have been determined the discontinuities may be formed within the resistive layer 30 by a process of selective etching. In this process a screen containing the pattern of the coating of the resistive layer 30 which is to remain is placed over a continuous layer of the indium-tin-oxide or other material comprising the resistive layer and having the required surface resistivity. Subsequently acid is applied to the resistive layer and to the screen. The acid etches away the portion of the coating which is not covered by the screen to thereby form voids or discontinuities in these areas. Where a conductivity band is desired, a coating having a surface resistivity suitable for such a band is applied to a digitizer and the process of selective etching is utilized to obtain an active area having desired edge-to-edge resitances.

From the above it may be seen that the present invention provides a resistive layer type digitizer which is subtantially immune to the effects of stray capacitance and to the effects of environmental noise and which will not experience drift.

Since certain changes may be made to the above-described apparatus without departing from the scope of the invention herein, it is intended that all matter contained in the description thereof as shown in the accompanying drawings whall be interpreted as illustrative and not in a limiting sense.

We claim:
1. Electrographic apparatus comprising:
an electrically insulative support;
a layer provided as an indium-tin-oxide grain deposition located upon said support having a thickness greater than about 400 angstrum units predetermined to avoid resistivity drift phenomena occasioned by environmental interaction with the outwardly exposed grains of said layer and having a given surface resistivity corresponding with said predetermined thickness;

said layer defining an active area located within a given profile having a widthwise extent in an x-coordinate direction between first and second spaced apart edges which exhibits a first edge-to-edge resistance therebetween and a lengthwise extent in a y-coordinate direction between third and fourth spaced apart edges which exhibits a second edge-to-edge resistance therebetween;

said layer within said active area having a pattern of discrete discontinuities;

wherein said pattern of discontinuities is configured to provide an edge-to-edge resistance aspect ratio between 0.5 and 2.0;

said first and said second edge-to-edge resistances being within a range of about 400 to 3,000 ohms; and access means for capacitively accessing said layer to derive position related signals.

2. The electrographic apparatus of claim 1 in which:
each of said discrete discontinuities includes a width dimension which extends in the x-coordinate direction;
each of said discrete discontinuities includes a height dimension which extends in the y-coordinate direction;
adjacent ones of said discontinuities defining a first set of parallel tracks in which each track has the same widthwise dimension, T1, extending between said discontinuities in said x-coordinate direction;
adjacent ones of said discontinuities defining a second set of parallel tracks in which each track has the same widthwise dimension T2 extending between said discontinuities in said y-coordinate direction;
said first edge-to-edge resistance divided by said given surface resistivity has a value N1;
said second edge-to-edge resistance divided by said given surface resistivity has a value N2;
said width dimension being N1−1 times greater than the widthwise dimension T1 of a said track of said first set of tracks; and
said height dimension being N2−1 times greater than the widthwise dimension T2 of a said track of said second set of tracks.

3. The electrographic apparatus of claim 2 in which:
said widthwise dimension T1 of each one of said first set of tracks is equal to said widthwise dimension T2 of each one of said second set of tracks.

4. The electrographic apparatus of claim 2 in which:
said active area is square; and
said width dimension of said discontinuities is equal to said height dimension.

5. The electrographic apparatus of claim 2 in which:
said active area is rectangular and non-square; and
said width dimension of said discontinuities is unequal to said height dimension.

6. The electrographic apparatus of claim 1 in which:
said layer extends from said given profile to an outer profile located outwardly of said given profile to define an enhanced conductivity band therebetween exhibiting a surface resistivity corresponding with said given surface resistivity; and
said access means includes electrode means coupled in electrical association with said enhanced conductivity band.

7. The electrographic apparatus of claim 6 in which a second pattern of discontinuities is provided in said enhanced conductivity bands.

8. The electrographic system of claim 1 in which said given surface resistivity is less than about 400 ohms per square.

9. The electrographic system of claim 1 in which said edge-to-edge resistance aspect ratio is unity.

10. An electrographic system comprising:
an electrically insulative support;
a layer provided as an indium-tin-oxide grain deposition located upon said support having a thickness greater than about 400 angstrum units predetermined to avoid resistivity drift phenomena occasioned by environmental interaction with the outwardly exposed grains of said layer and having a given surface resistivity corresponding with said predetermined thickness;
said layer defining an active area located within a given profile having a widthwise extent in an x-coordinate direction between first and second spaced-apart edges which exhibits a first edge-to-edge resistance therebetween and a lengthwise extent in a y-coordinate direction between third and fourth spaced-apart edges which exhibits a second edge-to-edge resistance therebetween;
said layer within said active area having a pattern of discrete discontinuities;
each of said discrete discontinuities includes a width dimension which extends in the x-coordinate direction;
each of said discrete discontinuities includes a height dimension which extends in the y-coordinate direction;
adjacent ones of said discontinuities defining a first set of parallel tracks in which each track has the same widthwise dimension, T1, extending between said discontinuities in said x-coordinate direction;
adjacent ones of said discontinuities defining a second set of parallel tracks in which each track has the same widthwise dimension T2 extending between said discontinuities in said y-coordinate direction;
said first edge-to-edge resistance divided by said given surface resistivity having the value N1;
said second edge-to-edge resistance divided by said given surface resistivity having the value N2;
said width dimension being N1−1 times greater than the widthwise dimension T1 of a said track of said first set of tracks;
said height component being N2−1 times greater than the widthwise dimension T2 of a said track of said second set of tracks;
said discontinuities being configured to provide an edge-to-edge resistance aspect ratio of unity;
said first and said second edge-to-edge resistances being within a range of about 400 to 3,000 ohms;
said layer extends from said given profile to an outer profile to define an enhanced conductivity band therebetween exhibiting a surface resistivity corresponding with said given surface resistivity;
access means including electrode means coupled in electrical association with said enhanced conductivity band;
locator means locatable adjacent said active area;
a time varying a.c. excitation source having a frequency of less than about 250 KHz;
a ground reference;
control means for collecting a signal from said locator means; and
means for selectively electrically communicating said excitation source and said ground reference with said electrode means.

* * * * *